(12) United States Patent
Madrigal et al.

(10) Patent No.: US 11,702,208 B2
(45) Date of Patent: Jul. 18, 2023

(54) AUXETIC SUPPORT ELEMENTS WITH ERGONOMIC CURVATURES FOR PASSENGER SEATS

(71) Applicant: Safran Seats USA LLC, Gainesville, TX (US)

(72) Inventors: Jose Madrigal, Chihuahua (MX); Mario Herrera, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/632,227

(22) PCT Filed: Aug. 29, 2019

(86) PCT No.: PCT/US2019/048795
§ 371 (c)(1),
(2) Date: Feb. 1, 2022

(87) PCT Pub. No.: WO2021/040718
PCT Pub. Date: Mar. 4, 2021

(65) Prior Publication Data
US 2022/0281606 A1    Sep. 8, 2022

(51) Int. Cl.
*B64D 11/06*    (2006.01)

(52) U.S. Cl.
CPC ...... *B64D 11/0619* (2014.12); *B64D 11/0647* (2014.12)

(58) Field of Classification Search
CPC ... B64D 11/0619; B64D 11/0647; A47C 5/12; A47C 3/00
USPC .................................................. 297/452.48
See application file for complete search history.

(56) References Cited

U.S. PATENT DOCUMENTS

| | | | |
|---|---|---|---|
| 2005/0287371 A1* | 12/2005 | Chaudhari | B60R 19/18 428/480 |
| 2012/0253752 A1* | 10/2012 | Brauer | B64D 11/0647 703/1 |
| 2015/0320220 A1 | 11/2015 | Eberlein et al. | |
| 2017/0354256 A1* | 12/2017 | Peterson | A47C 7/40 |

FOREIGN PATENT DOCUMENTS

| EP | 1612108 A1 | 1/2006 |
|---|---|---|
| EP | 3492254 A1 | 6/2019 |

OTHER PUBLICATIONS

International Patent Application No. PCT/US2019/048795, International Search Report and Written Opinion, dated Jun. 4, 2020.

* cited by examiner

*Primary Examiner* — Mark R Wendell
(74) *Attorney, Agent, or Firm* — Kilpatrick Townsend & Stockton LLP

(57) ABSTRACT

Described are support assemblies for a passenger seat, that can include a supportive surface configured to connect with a frame of a passenger seat, and shaped to support a passenger. Supportive surfaces can include a first portion formed of a first plurality of cells having an auxetic cell geometry that can deform to adopt a synclastic curvature under stress, and a second portion formed of a second plurality of cells having a non-auxetic cell geometry that can deform to adopt an anticlastic or cylindrical curvature under stress. The regions having respective auxetic and non-auxetic cell geometries can be arranged to form a supportive surface that can flex to follow contours of a seated passenger.

20 Claims, 13 Drawing Sheets

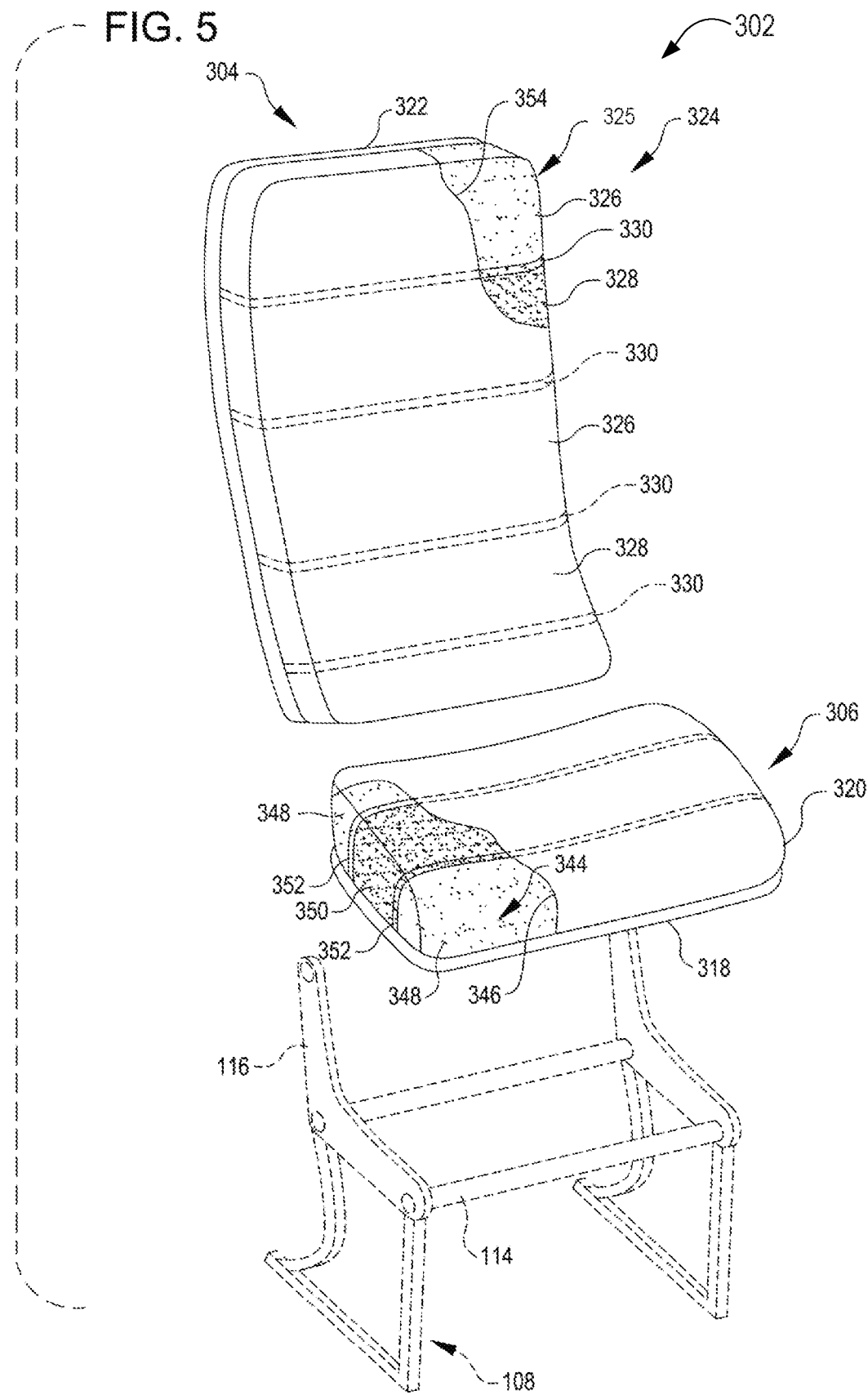

AUXETIC SUPPORT ELEMENTS WITH ERGONOMIC CURVATURES FOR PASSENGER SEATS

CROSS-REFERENCE TO RELATED APPLICATIONS

This application is a national stage application of International Patent Application PCT/US2019/048795, filed on Aug. 29, 2019 and titled AUXETIC SUPPORT ELEMENTS WITH ERGONOMIC CURVATURES FOR PASSENGER SEATS, the content of which is hereby incorporated by reference in its entirety.

FIELD OF THE INVENTION

The field of the invention relates to shaped support features for improving passenger comfort.

BACKGROUND

In commercial aircraft, seats are designed to meet the needs of passenger safety and comfort, while accounting for strict limitations on weight and space. In existing aircraft designs, passenger seats are designed with rigid supportive structures to meet safety criteria, with combinations of heavy foam cushioning, collapsible structures, and restraints to provide support for passengers and to protect passengers against injury in the event of emergency landings, turbulence, or other deceleration events. However, air travel can require passengers to remain seated for prolonged periods of time, making the comfort of passenger seats of paramount importance. Therefore, improved solutions for passenger seating that improve passenger comfort without comprising safety or adding weight are desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, support assemblies for a passenger seat having auxetic supportive surfaces are disclosed. Embodiments of auxetic support assemblies can include a supportive surface configured to connect with a frame of a passenger seat, the supportive surface shaped to support a passenger. At least one portion of the supportive surface has cells with an auxetic cell geometry that, in bulk, cause the supportive surface to adopt a synclastic curvature when deformed under stress. A second portion of the supportive surface can be characterized by a non-auxetic cell geometry that can deform to adopt an anticlastic or cylindrical curvature under stress. In some embodiments, alternating auxetic and non-auxetic zones of the supportive surface can act together to provide a supportive surface that deforms differently across different regions of the supportive surface in order to better provide support for a passenger.

According to certain embodiments of the present invention, passenger seats are disclosed having a frame and one or more supportive surfaces (e.g. seat backs, seat bottom cushions) connected with the frame and shaped to support a passenger, where the one or more supportive surfaces have at least one auxetic portion formed of cells having an auxetic cell geometry that can deform to adopt a synclastic curvature under stress, and at least one a second portion formed of a second plurality of cells having a non-auxetic cell geometry that can deform to adopt an anticlastic or cylindrical curvature under stress. Supportive surfaces as described herein can include supported elastic mesh, self-supported or stiffened mesh in the form of a shaped composite, auxetic foam, auxetic grids formed from a foam material, or elastic mesh-covered foam, among other materials.

According to certain embodiments of the present invention, method of producing an auxetic support assembly for a passenger seat are disclosed. Suitable methods can include generating a profile of seat supporting surface curvatures configured to support a passenger, and generating a matching profile of at least a first region having a synclastic curvature and a second region having a monoclastic curvature or an anticlastic curvature. A mesh can be generated having at least one corresponding zone that has an auxetic cell structure configured to adopt the synclastic curvature corresponding to the first region, and at least one non-auxetic cell structure corresponding to the second region.

BRIEF DESCRIPTION OF THE DRAWINGS

FIG. 5 is a simplified perspective view of a passenger seat having supportive surfaces that include zoned regions of compressible foam characterized by auxetic or non-auxetic cell structures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide supportive elements for passenger seats that contain auxetic geometries for improved ergonomic performance. Passenger-supportive elements (e.g. passenger supports of the seat backs, seat bottoms, or the various cushioning elements) can have auxetic properties that enable the supportive elements to deform in a synclastic (i.e., wrapping) manner in response to a passenger's weight.

The term "auxetic" as applied herein refers to materials, mesh, or grids at least partially composed of cells having an auxetic geometry. Such cells, when subjected to a compressive force in one direction, will tend to compress in an orthogonal direction, as opposed to non-auxetic cells that tend to expand in the orthogonal direction when compressed. This phenomenon is also referred to as having a negative Poisson's ratio. Similarly, when auxetic cells are subjected to pulling in one direction, they will tend to also expand in the orthogonal direction. In bulk, auxetic materials, mesh, and grids formed from many cells tend to exhibit the same phenomenon.

In specific embodiments, passenger-supportive elements can include alternating auxetic and non-auxetic portions that are placed strategically to envelop the passenger at some locations and to provide stiffer support (e.g., by way of anticlastic or monoclastic deformation) at other locations. While the supportive elements are discussed for use with aircraft seats, they are by no means so limited. Rather, embodiments of the supportive elements may be used in passenger seats or other seats of any type or otherwise as desired.

Figure 1:
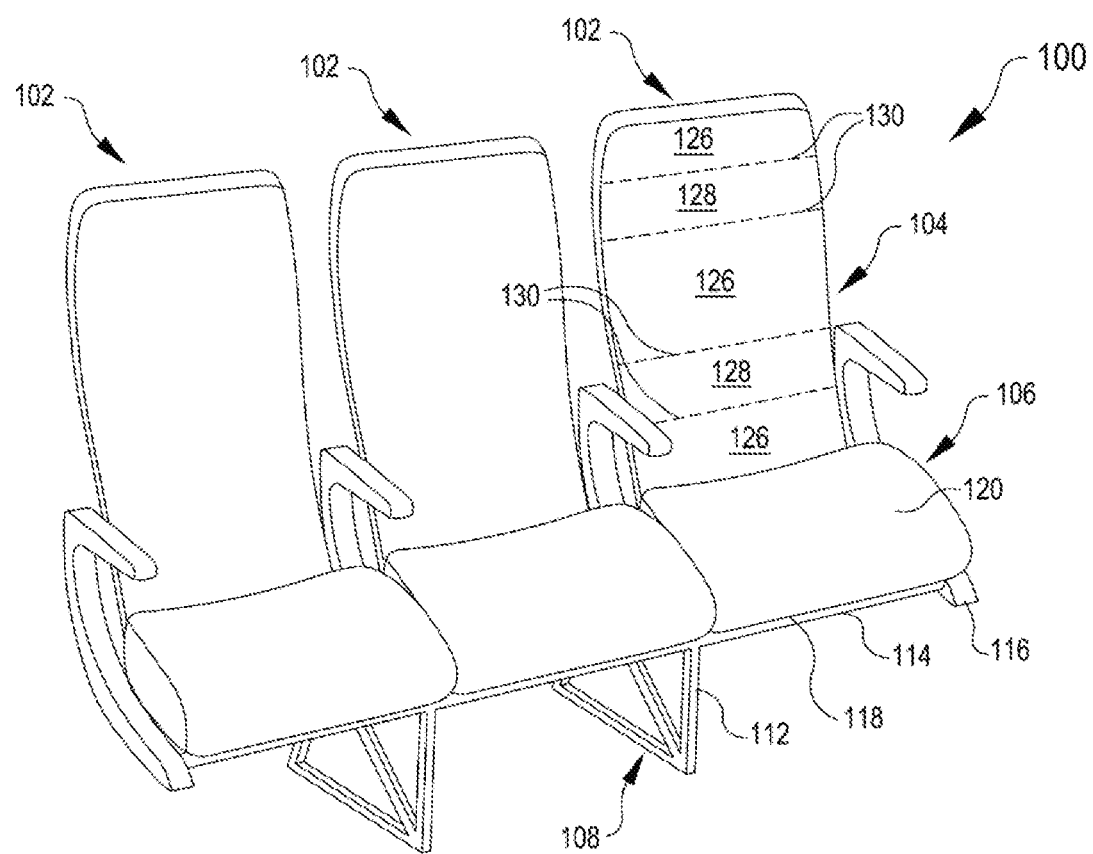
FIG. 1 is a simplified perspective view of a seating arrangement that includes passenger seats having zoned auxetic and non-auxetic supportive surfaces, in accordance with various embodiments.

According to certain embodiments of the present invention, as shown in FIG. 1, a passenger seat assembly 100 can include one or more passenger seats 102, each passenger seat having a seat back 104 and seat bottom 106 supported by a seat frame 108. Various configurations are possible, but in some embodiments, the seat frame 108 can include supportive struts 112 connected by structural tubes 114 that support the seat bottom 106, and spreaders 116 that can support the seat back 104 and armrests 110. The seat bottom 106 and seat back 104 are primarily responsible for supporting and cushioning the passenger during flight.

The seat back 104 can include a seat back frame 122 that supports a supportive surface 124. The supportive surface 124 can have a variety of configurations, including: suspended or stretched mesh, shaped polymer or polymer composite, covered foam cushioning, or other suitable materials. In at least one embodiment, the supportive surface 124 includes alternating auxetic zones 128 and non-auxetic zones 126 separated by transitional zones 130. Auxetic zones 128 can be formed by, e.g., a suspended auxetic mesh, supported auxetic grid, auxetic foam, or foam-supported auxetic mesh, as will be described below in greater detail. Non-auxetic zones can be formed using suspended mesh, supported grid, foam, or foam-supported mesh using a variety of conventional and novel, non-auxetic, foam or grid geometries. The transitional zones 130 can define immediate or gradual transitions. For example, in some embodiments, a suspended auxetic mesh or auxetic grid can transition seamlessly and gradually from having an auxetic geometry to having a non-auxetic geometry by the inclusion of cells having intermediate cell shapes that fit between the auxetic cells and non-auxetic cells. In some other embodiments, auxetic mesh or grid can transition immediately without the inclusion of intermediate cell shapes. In still other embodiments, separate panels of mesh, grid, or foam can be placed adjacent to one another, alternating between panels having auxetic properties and non-auxetic properties.

Similarly, the seat bottom 106 can include a seat bottom frame or pan 118 that supports a seat bottom supportive surface 120, such as a cushion, suspended mesh, or the like. The seat bottom supportive surface 120 can also, like the seat back supportive surface 124, be composed of an auxetic foam, mesh, or grid; or can include alternating portions having auxetic and non-auxetic properties. Specific details of some alternating auxetic/non-auxetic geometries are described below with reference to FIG. 2.

Structural components of the seat assembly 100, including the seat frame 108, seat bottom 106, seat back 104, and other components, may be formed of materials including but not limited to aluminum, stainless steel, aramid fibers, polycarbonate, polypropylene, other metallic materials, composite materials, or other similar materials, except where expressly stated otherwise.

Figure 2:
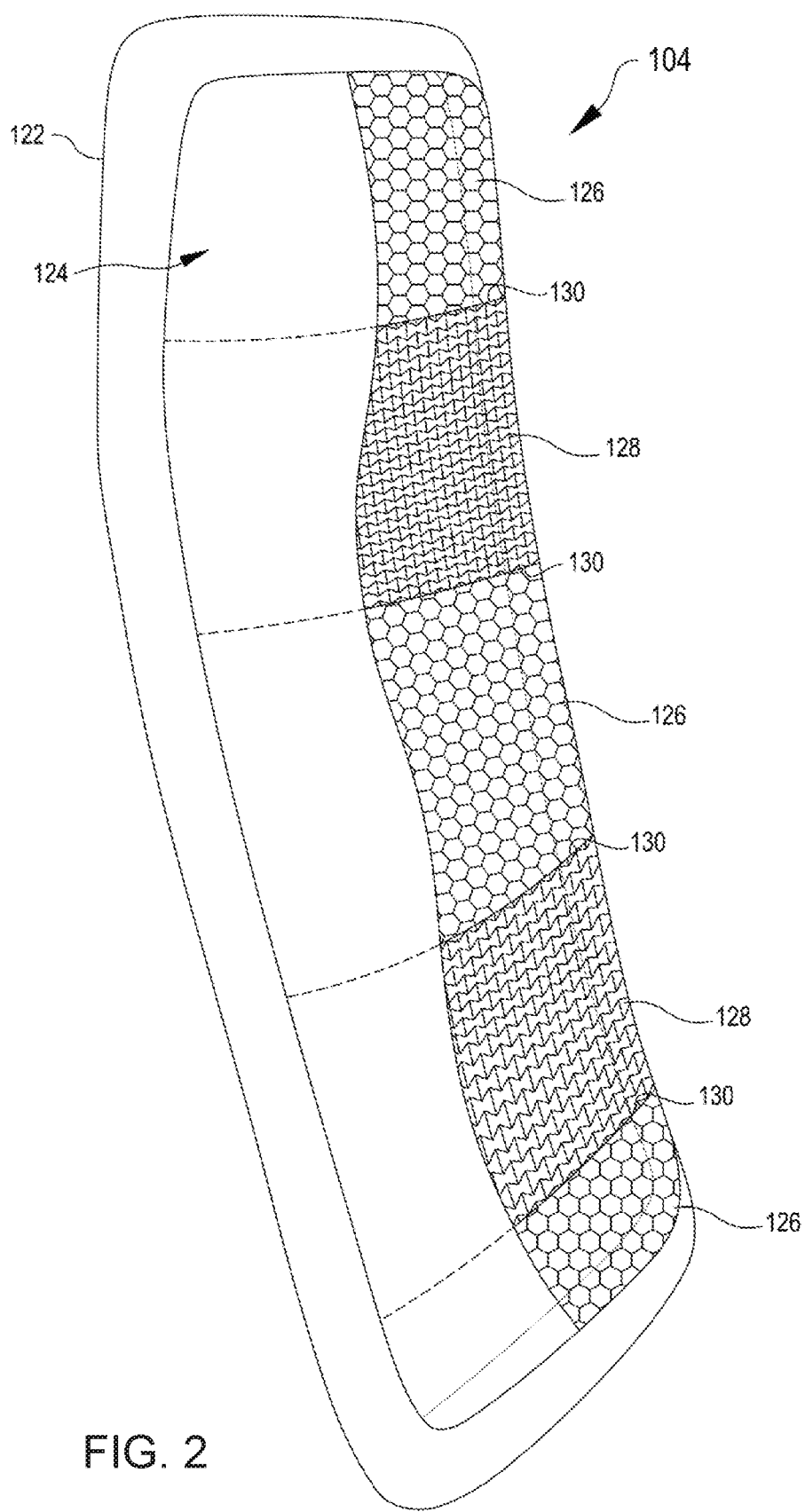
FIG. 2 is a simplified perspective view of a seat back assembly that has a supportive surface including zoned auxetic and non-auxetic mesh.

FIG. 2 is a simplified perspective view of a seat back 104 that has a supportive surface 124 including zoned auxetic and non-auxetic mesh. The supportive surface 124 is a supported mesh, which can be held in tension on a seat back frame 122. The supporting surface 124 is formed of a mesh that can be a woven, a non-woven, a perforated membrane (e.g., a formed polymer layer modified by patterned removal), a polymer membrane formed with voids in the grid pattern, or any other suitable mesh. The supporting surface 124 may also include any suitable cushioning or covering, such as a foam layer and textile, leather, vinyl, or other suitable covering.

The supporting surface 124 includes at least one auxetic zone 128, which can occupy any suitable portion of the supporting surface. In some embodiments, the supportive surface 124 can be formed of a suspended auxetic mesh such that the entirety of the supporting surface tends to deform in a synclastic manner to cushion and envelope a seated passenger. In some embodiments, discreet portions of the supporting surface 124 can be auxetic zones 128 formed of an auxetic mesh, the auxetic zones positioned strategically so that the supporting surface deforms by different amounts across its length, so as to better accommodate the shape of a passenger's back and to provide an improved ergonomic support. In at least one embodiment, the supporting surface 124 has at least one major auxetic zone 128 positioned proximate the location of a passenger's upper back and shoulder, and may have additional auxetic zones below the passenger's lumbar, proximate a passenger's head, or at other positions. The exact locations of the alternating auxetic zones 128 and non-auxetic zones 126 may vary depending on the geometry of the seat back 104.

Auxetic zones 128 and non-auxetic zones 126 can be separated by transitional zones 130. In some embodiments, the transitional zones 130 can be gradual, with the cell shape of individual auxetic cells in the auxetic mesh changing over the space of several cell-lengths between an adjacent auxetic zone 128 and non-auxetic zone 126. In other embodiments, transitional zones 130 can immediately transition between adjacent zone. In still other embodiments, adjacent auxetic zones 128 and non-auxetic zones 126 can be formed of separate panels of the auxetic mesh that terminate adjacent to each other.

Figure 3:
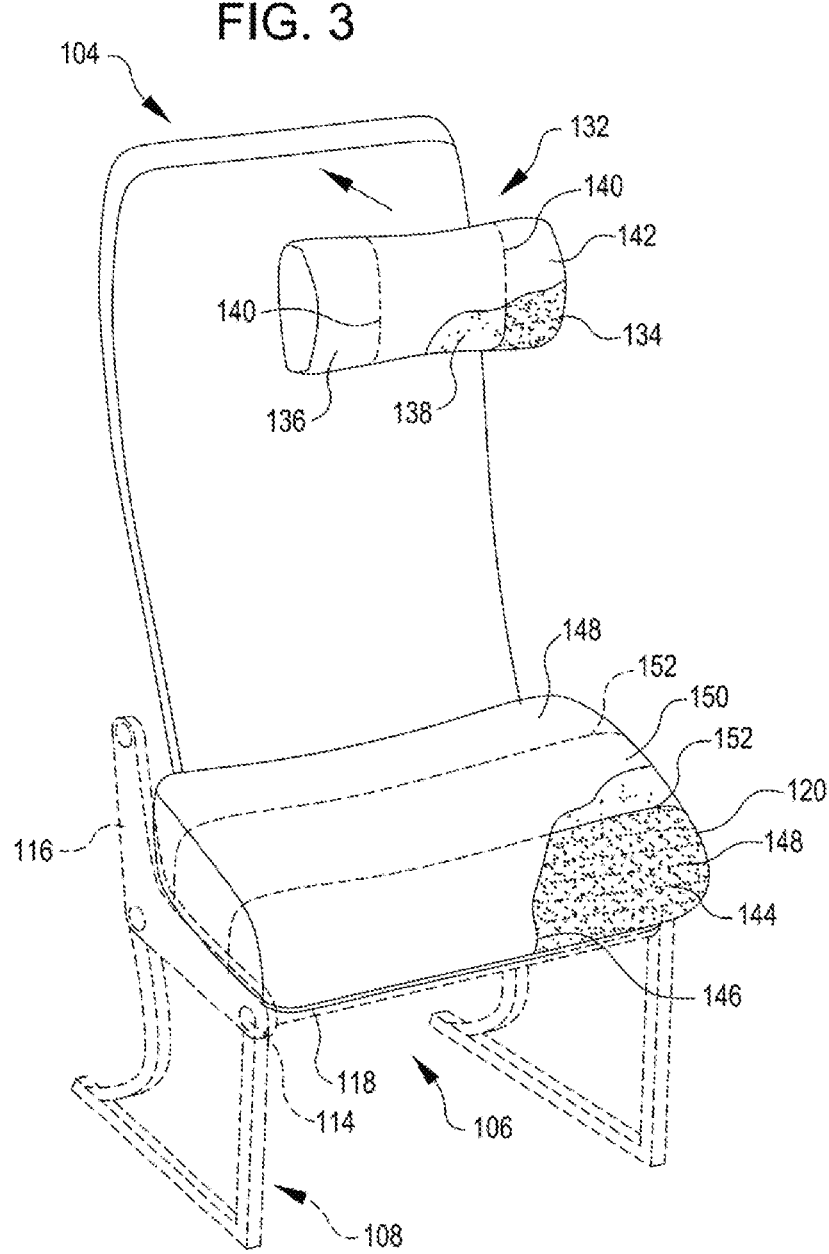
FIG. 3 is a simplified perspective view of a passenger seat having supportive surfaces that include covers having zoned auxetic and non-auxetic mesh.

FIG. 3 is a simplified perspective view of a passenger seat 102 having supportive surfaces that include a seat headrest cushion 132 and seat bottom supportive surface 120 that include zoned auxetic and non-auxetic mesh support surfaces, in accordance with various embodiments. The seat headrest cushion 132 can include a foam cushion 134 contained in an outer shell or casing 142 formed of alternating auxetic and non-auxetic mesh material, e.g., an auxetic casing zone 136 and non-auxetic casing zone 138 separated by transitional zones 140. The shape of the headrest cushion 132 can be determined based on the relative positioning of the auxetic casing zone (or zones) 136 and non-auxetic casing zone(s) 138, and may adopt a variety of specific configurations depending on the depth and geometry desired.

Similarly, the seat bottom supportive surface 120 can include seat bottom cushion 144 formed of a cushioning foam surrounded and at least partially shaped by a seat bottom cushion casing 146. The seat bottom cushion casing 146 can include non-auxetic zones 148 and auxetic zones 150, separated by transitional zones 152, and positioned to define the specific curvatures of the seat bottom cushion 144 and the degree to which the seat bottom cushion casing 146 permits deformation, e.g., with auxetic zones positioned at locations where greater inward deformation is desired.

Cushioning that employs auxetic casings as described above may be combined with embodiments of passenger seats that have suspended supportive elements. For example, one or both of the seat headrest cushion 132 and seat bottom supportive surface 120 described above may be employed in conjunction with a seat back 104 having a suspended mesh supporting surface 124, or with any other configuration of supportive surfaces as disclosed herein.

Figure 4:
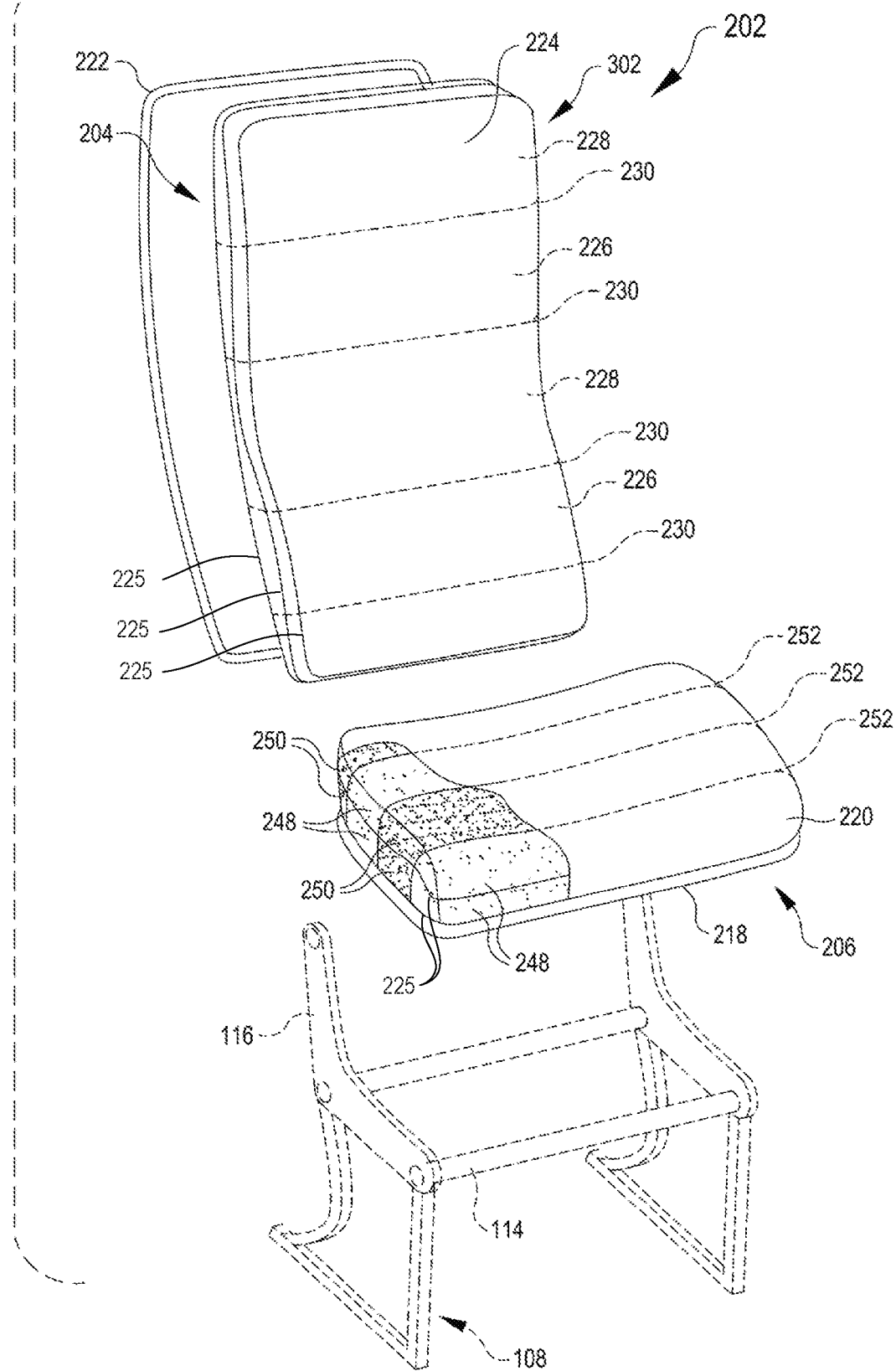
FIG. 4 is a simplified perspective view of a passenger seat having supportive surfaces that include a shaped and layered composite containing zoned auxetic and non-auxetic mesh.

Supported surfaces employing supported auxetic mesh and auxetic mesh coverings are discussed above; however, according to some embodiments, auxetic mesh can be used to form self-supporting composites. For example, FIG. 4 is a simplified perspective view of a passenger seat 202 having supportive surfaces that include a seat back 204 and seat bottom 206 having shaped and layered composite seat back supportive surface 224 and seat bottom supportive surface 220 each containing zoned auxetic and non-auxetic mesh. The seat back 204 can be mounted to a seat frame 108, and can include a seat back frame 222, and a seat back supportive surface 224 formed of a shaped and layered composite mounted to the seat back frame.

The seat back supportive surface 224 can include one or more auxetic zones 226 and non-auxetic zones 228 that define the type of curvature to which each zone is biased (e.g. synclastic, anticlastic, monoclastic), separated by transition zones 230. In accordance with various embodiments, each individual layer 225 can be shaped prior to injection with a polymer matrix or resin and subsequently cured to form a stiff polymer composite. The individual layers 225 can include auxetic/non-auxetic patterns having gradual transitions that are configured in series and laminated or otherwise cured parallel to each other to form the composite.

The seat bottom 206 can include a seat bottom pan 218 and seat bottom supportive surface 220, which can be formed from one or more foams having alternating non-auxetic zones 248 and transition zones 250 to accommodate and form to a seated passenger. According to some embodiments, the seat bottom supportive surface 220 can be formed of a foam that has been treated to contain regions composed of a reentrant cell structure having auxetic properties (the auxetic zones) separated from non-auxetic zones by transition zones 250. In some embodiments, adjacent foam elements may be used having auxetic bulk properties and non-auxetic bulk properties. One method for inducing an auxetic microstructure in a foam is by a combination of compressing the foam while heating the foam to a temperature band above the foam's softening point. This process mechanically modifies the normally convex cell structure into a re-entrant cell structure, thus embedding auxetic properties in the foam. The seat bottom supportive surface 220 can further include multiple layers 225 having different bulk properties (e.g., stiffness, microstructure) in order to fine-tune the supportive properties of the seat bottom cushion.

The shaped composite structure described with reference to the seat back supportive surface 224 can be used to form supportive surfaces other than seat backs. For example, similar structures can be formed to provide formed seating surfaces for a seat bottom, a seat headrest, a seat armrest, or for structures other than passenger supportive structures. Similarly, the zoned foam structure described with reference to seat bottom 206 can be used to provide auxetic foam supportive surfaces for seat backs, headrests, armrests, and the like, as described below with reference to FIG. 5.

FIG. 5 is a simplified perspective view of a foam-cushioned passenger seat 302 having seat back supportive surfaces 324, 320 that include zoned regions of compressible foam characterized by auxetic or non-auxetic cell structures. The foam-cushioned seat 302 includes a seat back 304 and seat bottom 206 mounted to a seat frame 108. The seat back 304 includes a seat back frame 322, which can be supported by spreaders 116 or comparable structural elements of the seat frame 108; which further supports a seat back supportive surface 324 formed of a foam body 325 made up of alternating auxetic foam elements 328 and non-auxetic foam elements 326. In some embodiments, the auxetic foam elements 328 and non-auxetic foam elements 326 are separate foam elements that are placed adjacent each other or bonded together at transitions 330. In some embodiments, the auxetic and non-auxetic foam elements 328, 326 can be portions of a monolithic foam element with alternating regions having auxetic properties and non-auxetic properties. The auxetic and non-auxetic foam elements 328, 326 may be covered by an outer covering 354.

Similarly, the seat bottom 306 can include a seat bottom pan 318 and seat bottom supportive surface 320 can include an inner foam body 344, which can be encased in a covering 346. The inner foam body 344 can be formed of alternating auxetic foam elements 350 and non-auxetic foam elements 348 separated at transitions 352, which can denote either separations between discreet foam elements or between regions of a monolithic foam body.

Figure 6A:
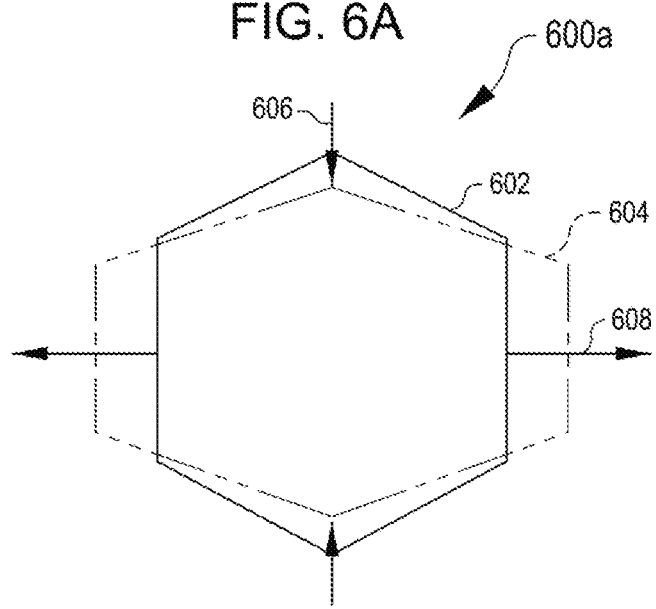
FIG. 6A and FIG. 6B illustrate expansion/contraction properties of model non-auxetic and auxetic cell geometries, respectively.
Figure 6B:
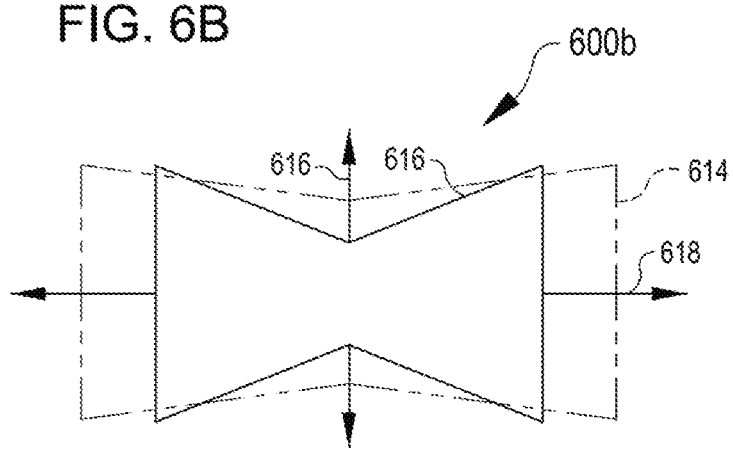

FIG. 6A and FIG. 6B illustrate expansion/contraction properties of a model non-auxetic cell geometry 600a and auxetic cell geometry 600b, respectively. The model non-auxetic cell geometry 600a shown in FIG. 6A is a hexagonal or honeycomb cell geometry common to a variety of applications. An initial cell shape 602, when subjected to compressive force 606, tends to compress in the direction of the compressive force while expanding in an orthogonal direction 608. A compressed shape 604 is shown for comparison, exhibiting a positive Poisson ratio. This form of expansion is common to a wide variety of conventional grid geometries, and is reversible—if the compressive force 606 is replaced with tension, the non-auxetic cell geometry 600a will tend to shrink in the orthogonal direction 608.

The model auxetic cell geometry 600b shown in FIG. 6B, by contrast, exhibits a negative Poisson ratio. The model auxetic cell geometry 600b is a bowtie-shaped concave hexagonal parallelagon, but a variety of auxetic grid geometries can be used that exhibit similar bulk properties, typically composed of cells having reentrant geometries. When an initial cell shape 612 having the auxetic cell geometry 600b is subjected to a tensile force 616, the cell expands in the orthogonal direction 618, adopting an expanded cell shape 614 that is larger in both directions. The process is reversible under compressive force, with the entire cell shape decreasing in area.

Figure 7A:
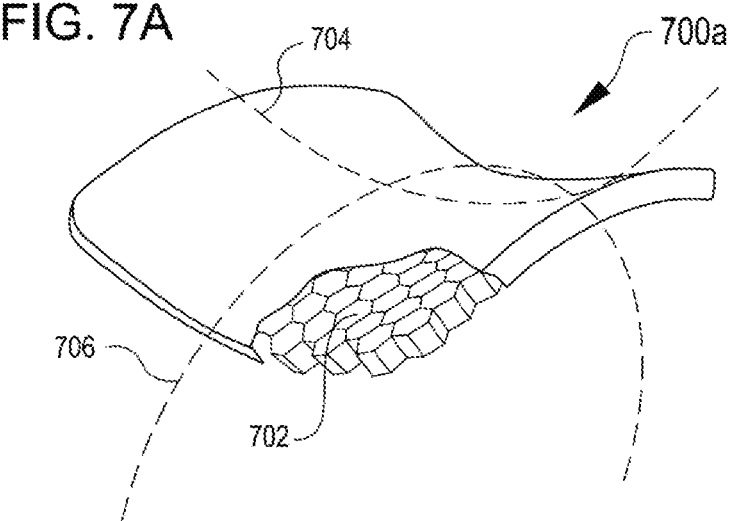
FIG. 7A, FIG. 7B, and FIG. 7C illustrate surface deformation properties of various non-auxetic and auxetic mesh grids that respond to deformation by exhibiting anticlastic, monoclastic, and synclastic curvatures, respectively.
Figure 7B:
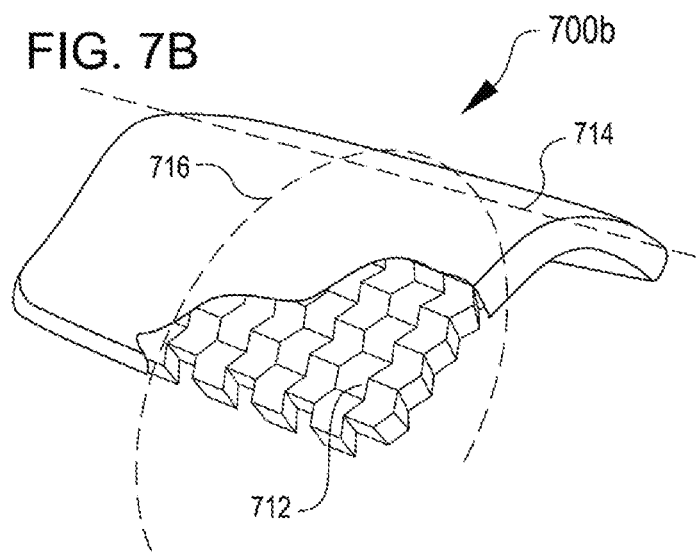
Figure 7C:
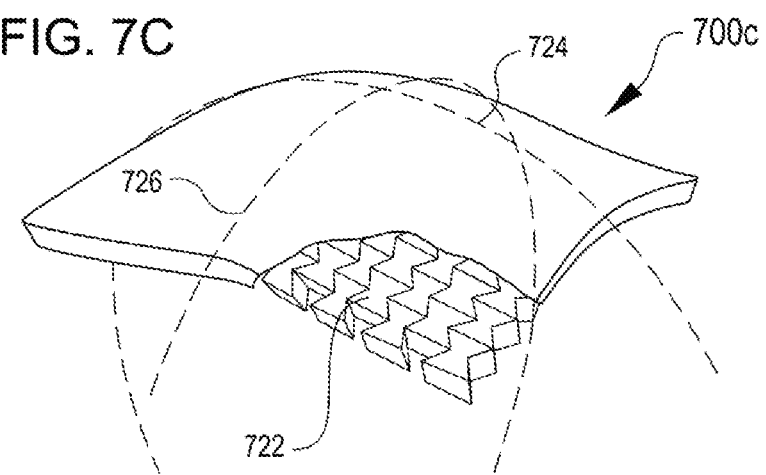

FIG. 7A, FIG. 7B, and FIG. 7C illustrate surface deformation properties of various non-auxetic and auxetic mesh grids that respond to deformation by exhibiting anticlastic, monoclastic, and synclastic curvatures, respectively. As shown in FIG. 7A, a first non-auxetic mesh 700a is composed of a non-auxetic grid, in this case a hexagonal grid 702. When the first non-auxetic mesh 700a is subjected to bending along a first curve 706 the grid will tend to cause the mesh to deform in an anticlastic configuration, bending in an everted or opposite second curve 704 orthogonal to the first. Anticlastic deformation corresponds to a saddle-like surface curvature. FIG. 7B illustrates a second, non-auxetic mesh 700b having an alternative grid configuration, in this case a chevron grid 712, that results in a monoclastic curvature during bending. When the non-auxetic mesh 700b is subjected to bending along the first curve 716, the chevron grid 712 deforms without everting, such that the mesh remains straight in the orthogonal direction 714. In contrast, FIG. 7C illustrates an auxetic mesh 700c having an auxetic grid 722. When the auxetic mesh 700c is subjected to bending along a first curve 726, the auxetic grid 722 causes the mesh to draw inward and to also bend in the same direction along the orthogonal, second curve 724.

Supportive surfaces described herein (e.g. seat back supportive surface 124, 224, 324) that have alternating auxetic and non-auxetic zones will tend to exhibit deformation at each respective zone according to whether the supportive surface at each location is auxetic or non-auxetic, in particular, by adopting a synclastic curvature under load for each auxetic zone, and either a monoclastic or anticlastic curvature under load for each non-auxetic zone. According to some embodiments, the non-auxetic zones may have a mesh grid configuration that causes anticlastic deformation, or a configuration that causes monoclastic deformation, or may have a combination of non-auxetic zones of each type, depending on the deformation requirements of the specific zone that best match the shape of a seated passenger.

Figure 8A:
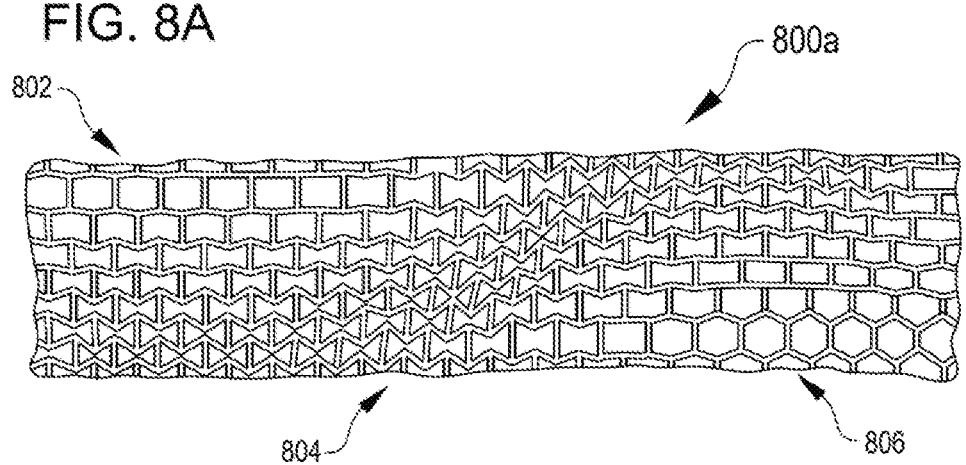
FIG. 8A and FIG. 8B illustrate a curved transition zone and a linear transition zone, respectively, between an auxetic grid and a non-auxetic grid.
Figure 8B:
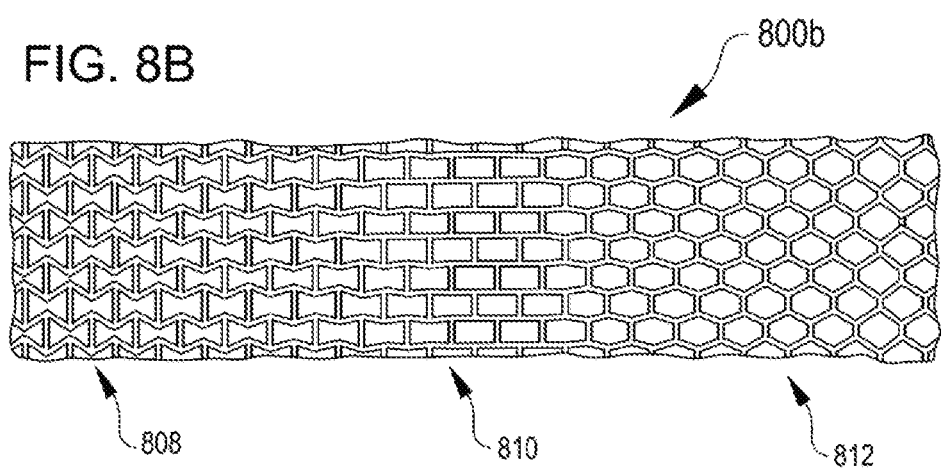

Transitions between auxetic and non-auxetic zones can be accomplished in a variety of configurations. For example, FIG. 8A illustrates a first section of mesh 800a that has a curved auxetic zone 804 that seamlessly transitions to hex-grid, non-auxetic zones 802, 806. The curved auxetic zone 804 softens the mesh 800a along its path. FIG. 8B illustrates a linear transition between an auxetic zone 808 and a hex grid 812, with a substantial transitional region 810 between the two. The specific locations of auxetic and non-auxetic zones can be selected to tune the specific shapes to which a supportive surface can deform.

Figure 9:
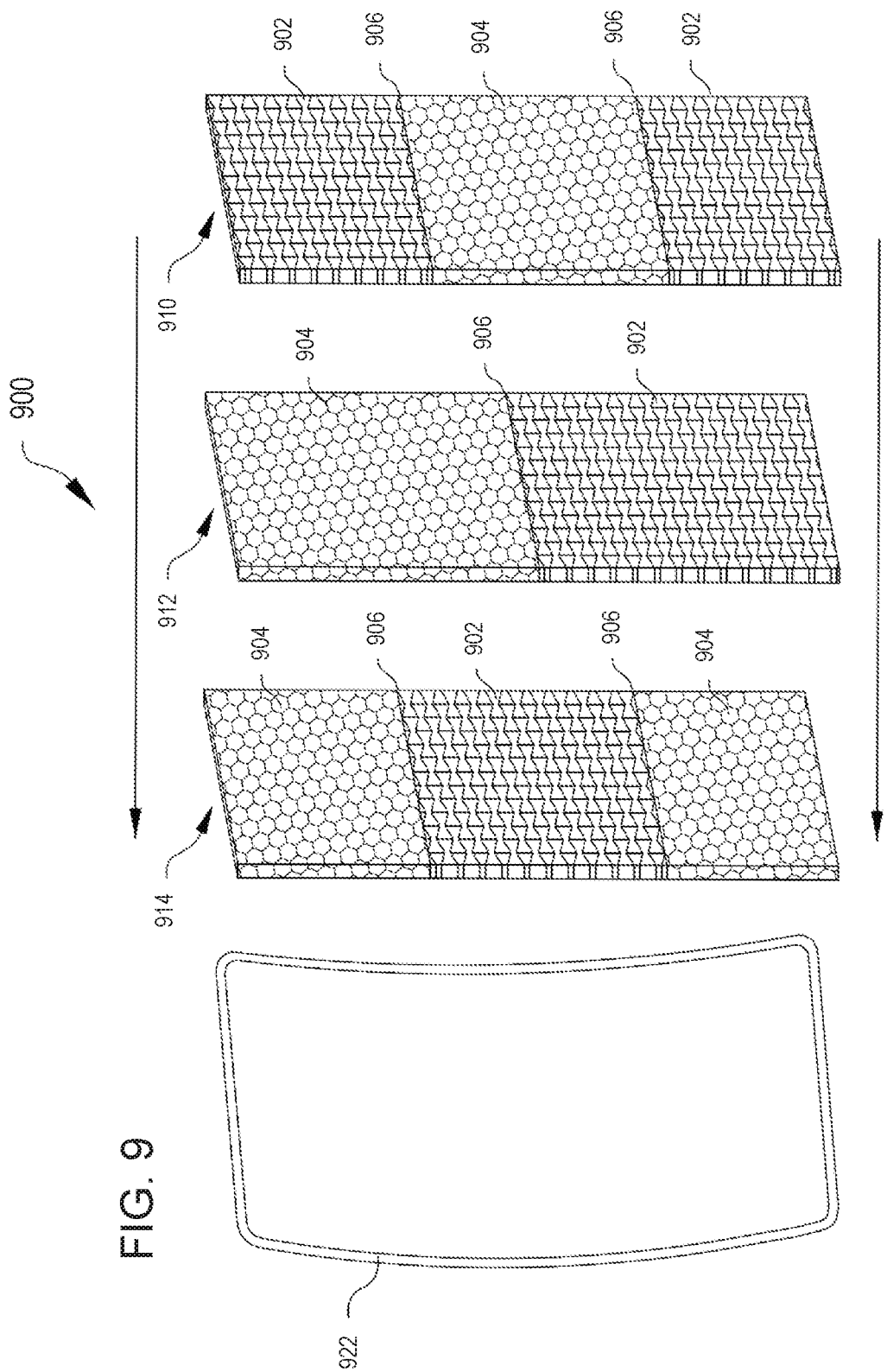
FIG. 9 is a simplified perspective view of a supportive element for a passenger seat having layered, deformable panels characterized by alternating auxetic and non-auxetic sections.

Layered auxetic and non-auxetic grids can be used to obtain additional mechanical properties. In particular, non-auxetic grids can be used to impart stiffness, while auxetic grids can be used to impart greater deformation under force. FIG. 9 is a simplified perspective view of a supportive element 900 for a passenger seat having layered, deformable panels 910, 912, 914 connected to a supportive structure 922, such as a seat back frame, seat bottom pan, or other seat structure. The layered, deformable panels 910, 912, 914 can be characterized by alternating auxetic zones 902 and non-auxetic zones 904 separated by transitional zones 906. Any suitable number of deformable panels may be used in a layered configuration, including fewer panels than shown, or more panels than shown; and the specific positions of the alternating auxetic zones 902 and non-auxetic zones 904 in each panel can vary. In some embodiments, layered deformable panels can be enclosed in an outer casing, similar to the casing of a foam seat (e.g., casing or outer covering 354, FIG. 5).

FIGS. 10, 11, 12, and 13 illustrate example processes for the generation and installation of alternating auxetic/non-auxetic passenger seat supportive surfaces in passenger seats. Processes 1000, 1100, 1200, and 1300 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of processes 1000, 1100, 1200, or 1300 may be performed manually.

Figure 10:
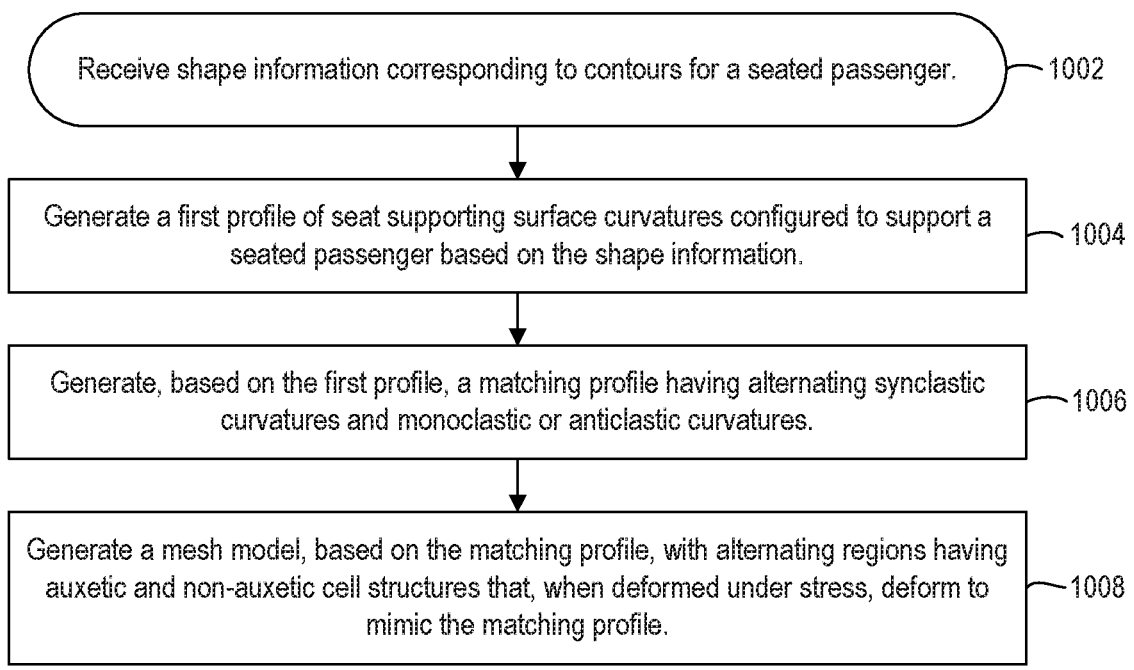
FIG. 10 illustrates an example process for generating an alternating auxetic/non-auxetic mesh or grid for a passenger seat supportive surface, in accordance with various embodiments.

FIG. 10 illustrates an example process 1000 for generating an alternating auxetic/non-auxetic mesh or grid for a passenger seat supportive surface, in accordance with various embodiments. First, shape information corresponding to contours for a model passenger, seated in the passenger seat, can be received by a suitable computing system (act 1002), which can use the shape information to generate a first profile of seat supporting curvatures configured to support a seated passenger, e.g., a contour map or suitable three-dimensional shape (act 1004). The shape information gathered for a model passenger (e.g., received in act 1002) could also be gathered from more than one, and potentially many passengers to obtain an average profile, in order to offer a comfort enhancement suitable across a variety of passenger body-types. The system can then generate, based on this first profile, a matching profile having alternating zones with synclastic curvatures and anticlastic or monoclastic curvatures that simulates the first profile (act 1006). The system can then generate a mesh model, based on the matching profile, that defines a mesh or grid containing alternating regions having auxetic and non-auxetic cell structures that, when deformed under stress, deform to mimic the matching profile (act 1008). The mesh model can be planar, or can be curved to match the contours of the model passenger. The granularity of the mesh model (i.e., the mesh size, cell thickness, etc.) can be adjusted to match specific grid materials, e.g. depending on whether the desired product is a suspended mesh, shaped panel, or foam panel; and the cell size of cells in the mesh model may also vary.

Figure 11:
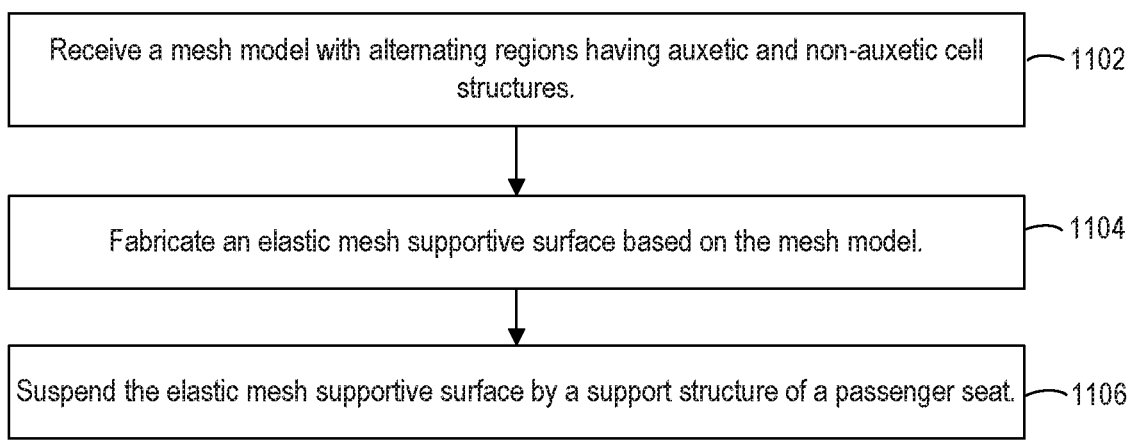
FIG. 11 illustrates a first example process for the fabrication and installation of a passenger seat supportive surface.

According to some embodiments, the mesh model (FIG. 10) may be used for generating a suspended mesh supportive surface (see, e.g., FIGS. 1-2). FIG. 11 illustrates a first example process 1100 for the fabrication and installation of a passenger seat supportive surface formed of a suspended mesh, in which the system first receives a mesh model with alternating regions having auxetic and non-auxetic cell structures (act 1102). An elastic mesh can be fabricated based on the mesh model (e.g., from a woven, a nonwoven, a perforated membrane, or a perforated foam) to form an elastic mesh supportive surface having auxetic cells based on the mesh model (act 1104). The elastic mesh can then be suspended on a support structure of the passenger seat, such as a seat back frame, seat bottom frame or pan (as shown in FIGS. 1-2), or can be connected to a cushion for installation on the seat back or seat bottom, or other suitable configuration, as shown in FIG. 3.

Figure 12:
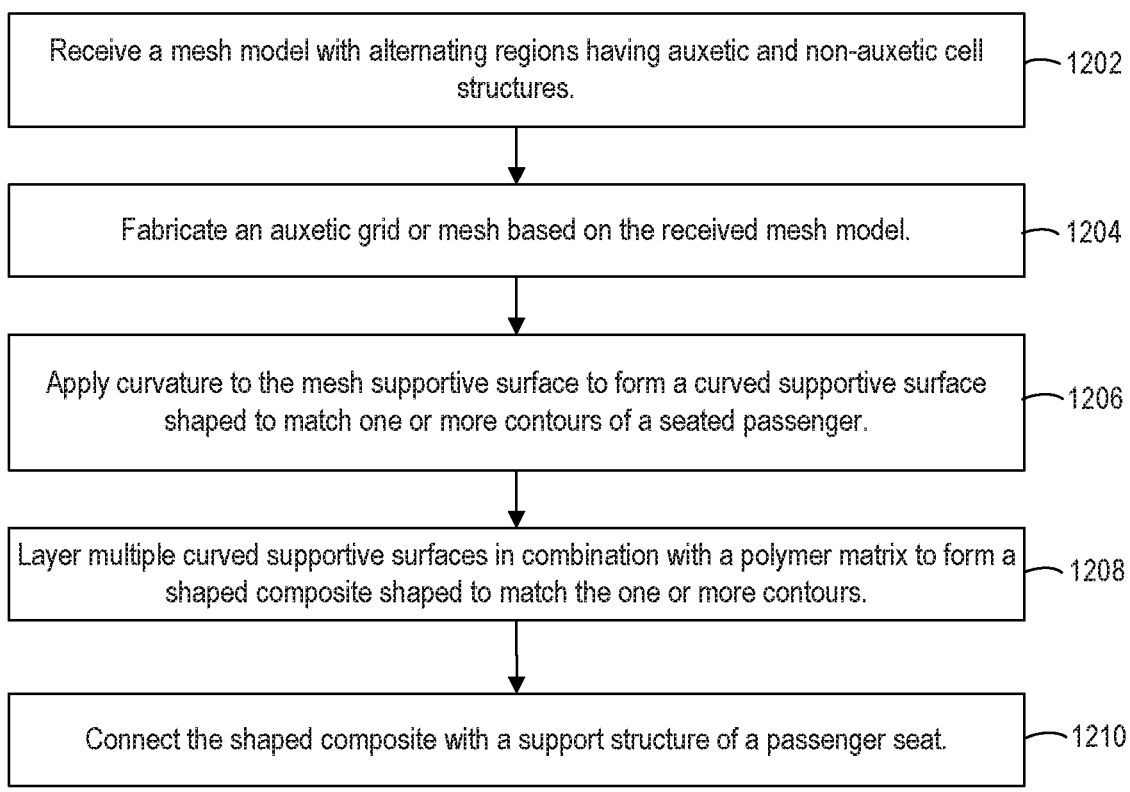
FIG. 12 illustrates a second example process example process for the fabrication and installation of a passenger seat supportive surface.

According to some other embodiments, the mesh model (FIG. 10) can be used for generating a shaped and stiffened supportive surface, such as a polymer composite as shown in FIG. 4. FIG. 12 illustrates a second example process example process 1200 for the fabrication and installation of a layered composite passenger seat supportive surface. In accordance with various embodiments, the system first receives a mesh model with alternating regions having auxetic and non-auxetic cell structures (act 1202). A grid or mesh can be fabricated based on the mesh model (act 1204), which will be biased to adopt alternating synclastic, anticlastic, and/or monoclastic curvatures depending on the specific mesh geometry. Curvature can be applied to the grid or mesh to form a curved supportive surface shape that matches a passenger contour (act 1206), and can be layered with one or more additional layers of grid or mesh to provide additional structural support and to create a substrate for a polymer composite (act 1208), which can be held in shape (e.g., by a mold or similar manufacturing process), infused with polymer resin or other suitable matrix, and cured to form a shaped composite that matches the passenger contour. The shaped composite can then be connected with a support structure (e.g. a seat back frame or seat bottom frame/seat pan) of the passenger seat (act 1210).

Figure 13:
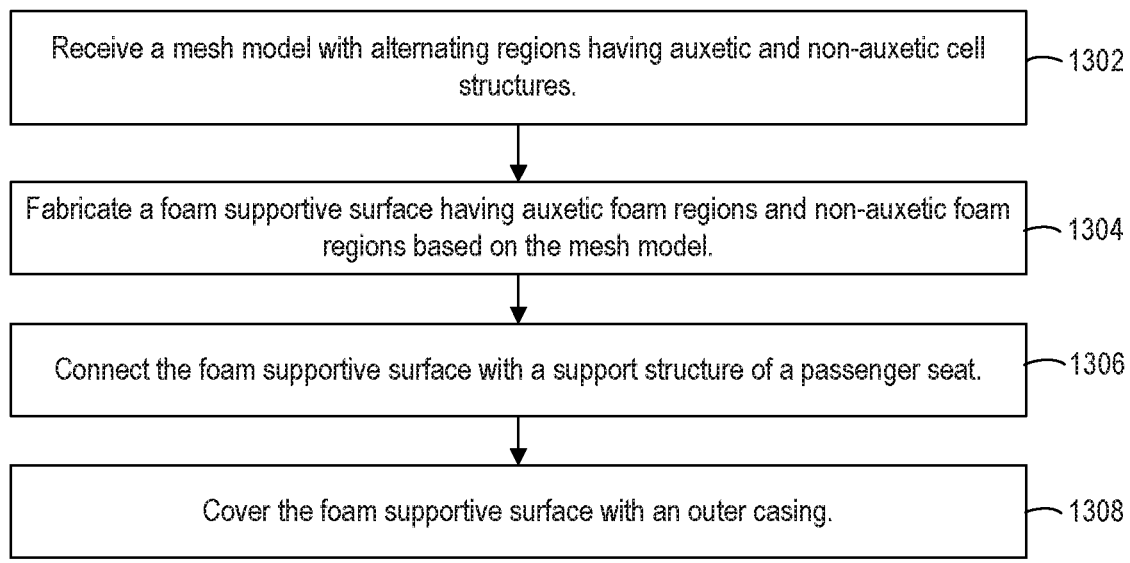
FIG. 13 illustrates a third example process 1300 for the fabrication and installation of a passenger seat supportive surface.

According to another embodiment, the mesh model (FIG. 10) can be used for generating a shaped foam surface having alternating auxetic and non-auxetic foam structures, as described with reference to FIG. 13. FIG. 13 illustrates a third example process 1300 for the fabrication and installation of a passenger seat supportive surface, in which the system first receives a mesh model with alternating regions having auxetic and non-auxetic cell structures (act 1302). The system can fabricate a foam having auxetic foam regions and non-auxetic foam regions based on the mesh model, or can assemble a series of foam elements having auxetic and non-auxetic cell geometries, to form a foam supportive surface that, when compressed, approximates a passenger contour (act 1304). The foam supportive surface can then be connected with a support structure of a passenger seat (e.g. a seat back frame or seat bottom pan) (act 1306), and in some embodiments, may be covered by an outer casing (1308).

In the following, further examples are described to facilitate the understanding of the invention:

Example A. A support assembly for a passenger seat, the support assembly comprising:
   a supportive surface configured to connect with a frame of a passenger seat, the supportive surface shaped to support a passenger, the supportive surface comprising:
      a first portion comprising a first plurality of cells having an auxetic cell geometry that can deform to adopt a synclastic curvature under stress; and
      a second portion comprising a second plurality of cells having a non-auxetic cell geometry that can deform to adopt an anticlastic or cylindrical curvature under stress.

Example B. The support assembly of example 1, wherein the supportive surface comprises a mesh support configured to contour around the passenger by deforming when the supportive surface is supported by the frame and occupied by the passenger.

Example C. The support assembly of any one of the preceding examples, wherein the supportive surface comprises a plurality of alternating portions comprising the auxetic cell geometry and non-auxetic cell geometry, including the first portion and second portion, arranged to conform to contours of the passenger.

Example D. The support assembly of any one of the preceding examples, wherein the supportive surface further comprises a transition portion wherein the auxetic cell geometry of the first portion transitions gradually to the non-auxetic cell geometry of second portion.

Example E. The support assembly of any one of the preceding examples, wherein the supportive surface further comprises a thermoplastic mesh or polymer composite mesh.

Example F. The support assembly of any one of the preceding examples, wherein:
   the supportive surface further comprises a polymer matrix integrated with the first plurality of cells and the second plurality of cells;
   and the supportive surface is formed in a contoured shape supported by the polymer matrix.

Example G. The support assembly of example F, wherein the supportive surface comprises a plurality of layered surfaces, each layered surface of the plurality of layered surfaces comprising a respective first plurality of cells and second plurality of cells, the plurality of layered surfaces integrated with the polymer matrix to form a layered composite.

Example H. The support assembly of example G, wherein the plurality of layered surfaces are laminated together.

Example I. The support assembly of any one of the preceding examples, wherein the supportive surface comprises one of a seat bottom support, back support, headrest, or armrest cushion.

Example J. The support assembly of any one of the preceding examples, wherein the first portion of the supportive surface has a first stiffness and the second portion of the supportive surface as a second stiffness that is different from the first stiffness.

Example K. The support assembly of any one of the preceding examples, wherein the first portion comprises an auxetic foam.

Example L. The support assembly of any one of examples A-J, wherein the first plurality of cells comprises a repeating array of hexagonal parallelogons.

Example M. A passenger seat, comprising:
  a frame; and
  a supportive surface connected with the frame and shaped to support a passenger, the supportive surface comprising:
    a first portion comprising a first plurality of cells having an auxetic cell geometry that can deform to adopt a synclastic curvature under stress; and
    a second portion comprising a second plurality of cells having a non-auxetic cell geometry that can deform to adopt an anticlastic or cylindrical curvature under stress.

Example N. The passenger seat of example 13, wherein the supportive surface comprises a mesh comprising a plurality of auxetic and non-auxetic portions, including the first portion and second portion, configured to adopt a profile of synclastic curvatures and monoclastic or anticlastic curvatures, the profile configured to cause the supportive surface to conform to a passenger by deforming in response to force exerted by the passenger when the passenger is seated in the passenger seat.

Example O. The passenger seat of example 13, wherein the supportive surface comprises a stiffened composite comprising a curved mesh layer comprising a plurality of auxetic and non-auxetic portions, including the first portion and second portion, contoured to match a profile of synclastic curvatures and monoclastic or anticlastic curvatures, the profile configured to cause the supportive surface to conform to a passenger when the passenger is seated in the passenger seat.

Example P. The passenger seat of example O, wherein the stiffened composite further comprises a plurality of curved mesh layers, including the curved mesh layer, integrated with a polymer matrix to form a layered composite.

Example Q. A computer-implemented method of producing an auxetic support assembly for a passenger seat, the computer-implemented method comprising:
  generating a first profile of seat supporting surface curvatures configured to support a passenger;
  generating, based on the first profile, a matching profile comprising at least a first region comprising a synclastic curvature and a second region comprising a monoclastic curvature or an anticlastic curvature, the matching profile configured to simulate the first profile; and
  forming a mesh based on the matching profile, the mesh comprising at least first portion comprising an auxetic cell structure configured to adopt the synclastic curvature corresponding to the first region, and a second portion comprising a non-auxetic cell structure and corresponding to the second region.

Example R. The computer-implemented method of example Q, further comprising:
  connecting the mesh with a frame element of the passenger seat, such that the mesh forms a supportive surface configured to deform in response to use by a passenger in order to adopt a blend of synclastic and monoclastic or anticlastic curvatures configured to support the passenger.

Example S. The computer-implemented method of example R, wherein forming the mesh comprises one or more of removing material from a substrate in an auxetic pattern, molding material in an auxetic pattern, or knitting material with an auxetic array.

Example T. The computer-implemented method of example Q, further comprising:
  applying curvature to the mesh, based on the matching profile, to form a curved supportive layer;
  stiffening the curved supportive layer by applying a polymer matrix to the cured supportive layer to form a curved supportive element; and
  connecting the curved supportive element to a frame element of the passenger seat.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A support assembly for a passenger seat, the support assembly comprising:
  a supportive surface configured to connect with a frame of the passenger seat, the supportive surface shaped to support a passenger, the supportive surface comprising:
    a first portion comprising a first plurality of cells having an auxetic cell geometry that can deform to adopt a synclastic curvature under stress; and
    a second portion comprising a second plurality of cells having a non-auxetic cell geometry that can deform to adopt an anticlastic or cylindrical curvature under stress,
  wherein the supportive surface further comprises a transition portion wherein the plurality of cells gradually transitions from the auxetic cell geometry of the first portion to the non-auxetic cell geometry of second portion.

2. The support assembly of claim 1, wherein the supportive surface comprises a mesh support configured to contour around the passenger by deforming when the supportive surface is supported by the frame and occupied by the passenger.

3. The support assembly of claim 1, wherein the supportive surface comprises a plurality of alternating portions comprising the auxetic cell geometry and non-auxetic cell geometry, including the first portion and second portion, arranged to conform to contours of the passenger.

4. The support assembly of claim 1, wherein the supportive surface further comprises a thermoplastic mesh or polymer composite mesh.

5. The support assembly of claim 1, wherein:
  the supportive surface further comprises a polymer matrix integrated with the first plurality of cells and the second plurality of cells;
  and the supportive surface is formed in a contoured shape supported by the polymer matrix.

6. The support assembly of claim 5, wherein the supportive surface comprises a plurality of layered surfaces, each layered surface of the plurality of layered surfaces comprising a respective first plurality of cells and second plurality of cells, the plurality of layered surfaces integrated with the polymer matrix to form a layered composite.

7. The support assembly of claim 6, wherein the plurality of layered surfaces are laminated together.

8. The support assembly of claim 1, wherein the supportive surface comprises one of a seat bottom support, back support, headrest, or armrest cushion.

9. The support assembly of claim 1, wherein the first portion of the supportive surface has a first stiffness and the second portion of the supportive surface as a second stiffness that is different from the first stiffness.

10. The support assembly of claim 1, wherein the first portion comprises an auxetic foam.

11. The support assembly of claim 1, wherein the first plurality of cells comprises a repeating array of hexagonal parallelogons.

12. The support assembly of claim 1, wherein the transition portion includes a plurality of transition cells having a transition cell geometry different from the auxetic cell geometry of the first portion and the non-auxetic cell geometry of the second portion.

13. A passenger seat, comprising:
a frame; and
a supportive surface connected with the frame and shaped to support a passenger, wherein the support surface includes a plurality of panels layered on each other, each panel comprising:
a first portion comprising a first plurality of cells having an auxetic cell geometry that can deform to adopt a synclastic curvature under stress; and
a second portion comprising a second plurality of cells having a non-auxetic cell geometry that can deform to adopt an anticlastic or cylindrical curvature under stress.

14. The passenger seat of claim 13, wherein the supportive surface comprises a mesh comprising a plurality of auxetic and non-auxetic portions, including the first portion and second portion, configured to adopt a profile of synclastic curvatures and monoclastic or anticlastic curvatures, the profile configured to cause the supportive surface to conform to a passenger by deforming in response to force exerted by the passenger when the passenger is seated in the passenger seat.

15. The passenger seat of claim 13, wherein the supportive surface comprises a stiffened composite comprising a curved mesh layer comprising a plurality of auxetic and non-auxetic portions, including the first portion and second portion, contoured to match a profile of synclastic curvatures and monoclastic or anticlastic curvatures, the profile configured to cause the supportive surface to conform to a passenger when the passenger is seated in the passenger seat.

16. The passenger seat of claim 15, wherein the stiffened composite further comprises a plurality of curved mesh layers, including the curved mesh layer, integrated with a polymer matrix to form a layered composite.

17. A computer-implemented method of producing an auxetic support assembly for a passenger seat, the computer-implemented method comprising:
generating a first profile of seat supporting surface curvatures configured to support a passenger;
generating, based on the first profile, a matching profile comprising at least a first region comprising a synclastic curvature and a second region comprising a monoclastic curvature or an anticlastic curvature, the matching profile configured to simulate the first profile; and
forming a mesh based on the matching profile, the mesh comprising at least first portion comprising an auxetic cell structure configured to adopt the synclastic curvature corresponding to the first region, and a second portion comprising a non-auxetic cell structure and corresponding to the second region.

18. The computer-implemented method of claim 17, further comprising:
connecting the mesh with a frame element of the passenger seat, such that the mesh forms a supportive surface configured to deform in response to use by a passenger in order to adopt a blend of synclastic and monoclastic or anticlastic curvatures configured to support the passenger.

19. The computer-implemented method of claim 18, wherein forming the mesh comprises one or more of removing material from a substrate in an auxetic pattern, molding material in an auxetic pattern, or knitting material with an auxetic array.

20. The computer-implemented method of claim 17, further comprising:
applying curvature to the mesh, based on the matching profile, to form a curved supportive layer;
stiffening the curved supportive layer by applying a polymer matrix to the cured supportive layer to form a curved supportive element; and
connecting the curved supportive element to a frame element of the passenger seat.

* * * * *